US008252885B2

(12) United States Patent
DiCosimo et al.

(10) Patent No.: US 8,252,885 B2
(45) Date of Patent: *Aug. 28, 2012

(54) PROCESS TO MAKE POLY(TRIMETHYLENE CARBONATE) GLYCOL

(75) Inventors: Robert DiCosimo, Chadda Ford, PA (US); Neville Everton Drysdale, Newark, DE (US); Hari Babu Sunkara, Hockessin, DE (US)

(73) Assignee: E I du Pont de Nemours and Company, Wilmington, DE (US)

( * ) Notice: Subject to any disclaimer, the term of this patent is extended or adjusted under 35 U.S.C. 154(b) by 313 days.

This patent is subject to a terminal disclaimer.

(21) Appl. No.: 12/277,633

(22) Filed: Nov. 25, 2008

(65) Prior Publication Data
US 2009/0143562 A1 Jun. 4, 2009

Related U.S. Application Data

(60) Provisional application No. 60/991,474, filed on Nov. 30, 2007.

(51) Int. Cl.
*C08G 64/02* (2006.01)
(52) U.S. Cl. ........ 528/196; 528/354; 528/359; 528/380; 528/403
(58) Field of Classification Search ............ 528/196, 528/405, 425, 354, 359, 380, 403; 568/595
See application file for complete search history.

(56) References Cited

U.S. PATENT DOCUMENTS 7,790,833 B2 * 9/2010 DiCosimo et al. ........... 528/196

FOREIGN PATENT DOCUMENTS

| EP | 0600417 A1 | 8/1994 |
| WO | 0164771 A2 | 9/2001 |

OTHER PUBLICATIONS

H. Hyun et al., J. Polym. Sci. Part A: Polym. Chem., 2006, vol. 44, pp. 4235-4241.
Y. Shibasaki et al., Activated Monomer Cationic Polymerization of 1,3-Dioxepan-2-One Initiated by Water-Hydrogen Chloride, Macromol. Rapid Commun., 1999, vol. 20:532-535.
Y. Shibasaki et al., Activated Monomer Cationic Polymerization of Lactones and the Application to Well-Defined Block Copolymer Synthesis With Seven-Membered Cyclic Carbonate, Macromolecules, 2000, vol. 33:4316-4320.
Ariga et al., Cationic Ring-Opening Polymerization of Cyclic Carbonates With Alkyl Halides to Yield Polycarbonate Without the Ether Unit by Suppression of Elimination of Carbon Dioxide, Macromolecules, 1997, vol. 30:737-744.
Kricheldorf et al., Polylactones. 16. Cationic Polymerization of Trimethylene Carbonate and Other Cyclic Carbonates, J. Macromol. Sci. Chem., 1989, vol. 26:631-644.
Matsuo et al., Cationic Ring-Opening Polymerization Behavior of an Aliphatic Seven-Membered Cyclic Carbonate, 1,3-Dioxepan-2-One, Macromol. Chem. Phys, 1998, vol. 199: 97-102.
Kricheldorf et al., Polymers of Carbonic Acid. XIV. High Molecular Weight Poly (Trimethylene Carbonate) by Ring-Opening Polymerization With Butyltin Chlorides As Initiators, J. Polymer Science: Part A: Polymer Chemistry, 1995, vol. 33: 2193-2201.
International Search Report, PCT Application PCT/US2008/084684.

* cited by examiner

*Primary Examiner* — Gregory Listvoyb

(57) ABSTRACT

This invention relates to the production of poly(trimethylene carbonate) glycol via the polymerization of trimethylene carbonate employing one or more acidic ion exchange resin catalysts in the presence of a solvent. The products formed are substantially free of these catalysts.

6 Claims, No Drawings

PROCESS TO MAKE POLY(TRIMETHYLENE CARBONATE) GLYCOL

FIELD OF THE INVENTION

This invention is directed to processes for making poly(trimethylene carbonate) glycol by the polymerization of trimethylene carbonate employing one or more acidic ion exchange resin catalysts in the presence of a solvent. The products formed are substantially free of the catalysts.

BACKGROUND

Poly(trimethylene carbonate) diols find use in a variety of materials. These diols have been prepared by the polymerization of trimethylene carbonate (TMC, 1,3-dioxan-2-one), generally using catalysts containing organometallic compounds such as zinc, tin and alkali metal compounds, as described in Hyun, H.; et. al. J. Polym. Sci. Part A: Polym. Chem.: Vol. 44 (2006). Also, it has been reported that TMC can be polymerized via various alcohol and HCl initiator systems, as described in Shibasaki, Y.; et al., Macromol. Rapid Commun. 20, 532 (1999) and Macromolecules 2000, 33, 4316. These methods necessitate the removal of the catalyst used, especially when the resulting diols are to be used in biomedical applications.

As described in Ariga et al., Macromolecules 1997, 30, 737-744 and in Kricheldorf et al., J. Macromol. Sci.—Chem A26(4), 631-644 (1989), in the cationic polymerization of TMC, the initiating agent becomes incorporated into the polymer ends.

There exists a need to produce catalyst-free poly(trimethylene carbonate) glycols via polymerization of trimethylene carbonate (TMC, 1,3-dioxan-2-one).

SUMMARY OF THE INVENTION

One aspect of the present invention is a process for producing poly(trimethylene carbonate) glycols, comprising contacting trimethylene carbonate with an acidic ion exchange resin as a catalyst, in the presence of one or more solvents at a temperature within the range from the freezing point of the solvent to about 30 degrees Celsius, to form a reaction mixture comprising poly(trimethylene carbonate) diol.

DETAILED DESCRIPTION

The present invention relates to a process to make poly(trimethylene carbonate) glycol (PTMC) from trimethylene carbonate (TMC, 1,3-dioxan-2-one) via polymerization in the presence of a solvent utilizing an acidic ion exchange resin catalyst and at temperatures between the freezing point of the solvent used to room temperature (generally about 20 to 30 degrees Celsius, typically around 25 degrees Celsius). The reaction can be represented by the Equation below:

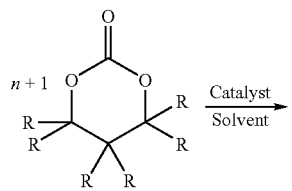

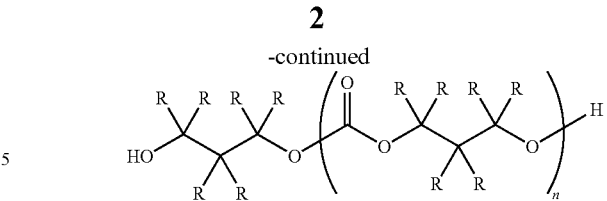

In the structure above, each R is independently H, $C_1$-$C_{20}$ alkyl, particularly $C_1$-$C_6$ alkyl; $C_3$-$C_{20}$ cyclic alkyl, particularly $C_3$-$C_6$ cyclic alkyl; $C_6$-$C_{25}$ aryl, particularly $C_6$-$C_{11}$ aryl; $C_6$-$C_{20}$ alkaryl, particularly $C_6$-$C_{11}$ alkaryl; $C_6$-$C_{20}$ arylalkyl, particularly $C_6$-$C_{11}$ arylalkyl; and wherein each R may form cyclics with other R groups; and each n is independently 2 to 100, and particularly 2 to 50.

The trimethylene carbonate can be derived from 1,3-propanediol. TMC can be prepared by any of the various chemical or biochemical methods known to those skilled in the art. Chemical methods for the preparation of TMC include, but are not limited to, a) reacting 1,3-propanediol with diethylcarbonate in the presence of zinc powder, zinc oxide, tin powder, tin halide or an organotin compound at elevated temperature, b) reacting 1,3-propanediol and phosgene or bis-chloroformates to produce a polycarbonate intermediate that is subsequently depolymerized using heat and, optionally, a catalyst, c) depolymerizing poly(trimethylene carbonate) in a wiped film evaporator under vacuum, d) reacting 1,3-propanediol and urea in the presence of metal oxides, e) dropwise addition of triethylamine to a solution of 1,3-propanediol and ethylchloroformate in THF, and f) reacting 1,3-propanediol and phosgene or diethylcarbonate. Biochemical methods for the preparation of TMC include, but are not limited to, a) lipase catalyzed condensation of diethylcarbonate or dimethylcarbonate with 1,3-propanediol in an organic solvent, and b) lipase-catalyzed depolymerization of poly(trimethylene carbonate) to produce TMC. The 1,3-propanediol and/or TMC can be obtained biochemically from a renewable source ("biologically-derived" 1,3-propanediol).

Preferably the 1,3-propanediol used as the reactant or as a component of the reactant has a purity of greater than about 99%, and more preferably greater than about 99.9%, by weight as determined by gas chromatographic analysis. The 1,3-propanediol preferably has the following characteristics:

(1) an ultraviolet absorption at 220 nm of less than about 0.200, and at 250 nm of less than about 0.075, and at 275 nm of less than about 0.075; and/or (2) CIELAB "b*" color value of less than about 0.15 (ASTM D6290), and an absorbance at 270 nm of less than about 0.075; and/or (3) a peroxide composition of less than about 10 ppm; and/or (4) a concentration of total organic impurities (organic compounds other than 1,3-propanediol) of less than about 400 ppm, more preferably less than about 300 ppm, and still more preferably less than about 150 ppm, as measured by gas chromatography.

The PTMCG can be isolated using known methods.

The processes disclosed herein employ an acidic ion exchange resin as a catalyst. Ion exchange resins suitable for use in the processes are available from a number of sources. The catalysts are generally added to the reactants to form a reaction mixture. As shown in the examples below, conveniently small amounts of these catalysts afford high conversion within about 25 hours.

Examples of acidic ion exchange resin catalysts suitable for use in the processes herein include sulfonated tetrafluoroethylene copolymers, for example, Nafion® SAC-13 or NAFION® NR50 (tetrafluoroethylene/perfluoro(4-methyl-3,6-dioxa-7-octene-1-sulfonic acid) copolymer, an ionomer available from E.I. DuPont de Nemours Company, Wilmington, Del., and poly(styrenesulfonic acid) crosslinked with divinylbenzene, for example, the hydrogen form of DOWEX® 50WX8-200, DOWEX® Marathon C, DOWEX® HCR-W2, DIAION® SK1B, DIAION® PK228, Purolite® C-100, IONAC® C-250, Amberlyst™ 70, and Monoplus S100H.

Preferred are sulfonated tetrafluoroethylene copolymers, for example NAFION® NR50 (tetrafluoroethylene/perfluoro(4-methyl-3,6-dioxa-7-octene-1-sulfonic acid) copolymer, an ionomer available from E.I. DuPont de Nemours and Company, Wilmington, Del., and DOWEX® 50WX8-200 ion-exchange resin available from Acros Organics N.V., Fair Lawn, N.J.

The process uses one or more solvents. Generally, any solvent can be used, as long as it is substantially non-reactive (i.e., does not react with the ingredients to form moieties that interfere with the reaction) with the reactants and/or catalyst. Examples of solvents useful in the process disclosed herein include but are not limited to methylene chloride, toluene and dioxane. As shown in the examples below, lower amounts of solvent generally provide for higher conversion rates.

The processes disclosed herein are carried out at ambient temperature, generally between about 20 and 30 degrees Celsius, but can be carried out as low as the freezing points of the solvents used. Once the reactants are added together, they may be mixed by any convenient method. The process can be done in batch, semi-batch or continuous mode, and generally are carried out in an inert atmosphere (i.e., under nitrogen).

Once the reactants have been contacted with the catalyst in the presence of one or more solvents, the reaction is allowed to continue for the desired time. Generally, at least 6 percent of the TMC polymerizes to give the desired poly(trimethylene carbonate) glycol after about 6 hours, with greater than about 75 percent conversion achieved within about 25 hours. As shown in the examples below, 100 percent conversion can be achieved by the selection of solvent and catalyst, and amounts thereof. Selection of solvent and catalyst and amounts thereof is within the purview of one skilled in the art.

Additionally, the desired degree of polymerization, n, can be achieved by selection of solvent and catalyst, and amounts thereof. As shown in the examples below, the use of methylene chloride and NAFION® NR50 copolymer affords a diol oligomer with an n of approximately 12, whereas the use of DOWEX® 50WX8-200 ion-exchange resin affords a resulting diol oligomer with an n of approximately 2.5. Generally, n is 2 to 100, and more specifically 2 to 50 in the present invention.

The resulting poly(trimethylene carbonate) glycol can be separated from the unreacted starting materials and catalyst by any convenient means, such as filtration, including filtration after concentration.

As shown in the examples below, the catalyst used can also be recycled a number of times (i.e., at least 12 cycles for NAFION® NR50 copolymer) and still provide for approximately 100 percent conversion of the reactants to the desired product.

The process disclosed herein allows for the degree of polymerization to be selected based on the solvent and/or catalyst chosen, and the amount of those materials used. This is advantageous as the materials resulting from the process can vary in properties including viscosity. The diols can find wide use in products including biomaterials, engineered polymers, personal care materials, coatings, lubricants and polycarbonate/polyurethanes (TPUs).

EXAMPLES

The processes being carried out in the following examples can be represented by the equation:

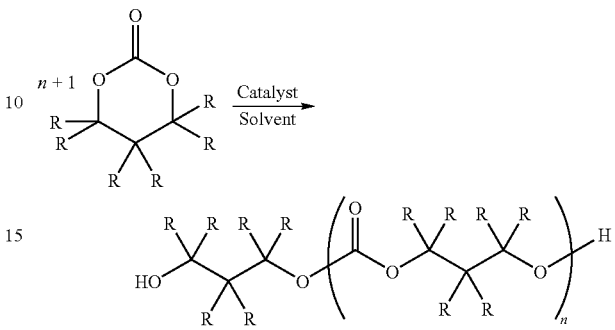

Example 1

This example demonstrates the production of poly(trimethylene carbonate) glycol using Nafion® NR50 copolymer as catalyst.

TMC (10.00 g, 0.098 mol), methylene chloride (25 g) and Nafion® NR50 (2.5 g) were placed in a round bottomed flask equipped with a stirrer and under nitrogen. The reaction mixture was stirred at room temperature. After 6 hrs an aliquot was withdrawn and concentrated at reduced pressure. Proton NMR analysis showed a ~31% conversion to poly(trimethylene carbonate)glycol. After 24 hours the reaction was diluted additional methylene chloride and the Nafion® filtered off. The filtrate was concentrated at reduced pressure. Proton NMR analysis of this material showed ~100% conversion, with n=~12.

Examples 2-4

These examples demonstrate the effect of solvent amount on the production of poly(trimethylene carbonate) glycol using Nafion® NR50 copolymer as catalyst.

TMC (10.00 g, 0.098 mol) and Nafion® NR50 copolymer (2.5 g) were placed in three round bottomed flasks equipped with stirrer and under nitrogen. To the first flask 25 mL of methylene chloride was added, to the second flask 50 mL of methylene chloride was added and to the third flask 100 mL of methylene chloride. The reaction mixture was stirred at room temperature. Aliquots were withdrawn after 17 hours and 25 hours, concentrated at reduced pressure and analyzed via Proton NMR. The following table tabulates the results:

| Example | Methylene Chloride (mL) | Conversion (17 Hr) (%) | Conversion (25 Hr) (%) | n (25 Hr) |
|---|---|---|---|---|
| 2 | 25 | 91.00 | 98.2 | 12.0 |
| 3 | 50 | 64.84 | 84.07 | 9.85 |
| 4 | 100 | 23.57 | 41.62 | 5.83 |

Example 5

This example demonstrates the production of poly(trimethylene carbonate) glycol using Dowex® 50x8-200 (Dowex®50W-Hydrogen) ion-exchange resin as catalyst.

TMC (10.00 g, 0.098 mol), toluene (25 g) and Dowex® 50x8-200 ion-exchange resin (Dowex®50W-Hydrogen) (2.5 g) were placed in a round bottomed flask equipped with a stirrer and under nitrogen. The reaction mixture was stirred at room temperature. After 6 hrs an aliquot was withdrawn and concentrated at reduced pressure. Proton NMR analysis showed a ~83% conversion to poly(trimethylene carbonate) glycol. After 24 hours the reaction was diluted additional methylene chloride and the Dowex® 50x8-200 ion-exchange resin (Dowex® 50W-Hydrogen) filtered off. The filtrate was concentrated at reduced pressure. Proton NMR analysis of this material showed ~100% conversion, with n=~3.8.

Examples 6-8

These examples demonstrate the effect of solvent amount on the production of poly(trimethylene carbonate) glycol using Dowex® 50x8-200 ion-exchange resin (Dowex®50W-Hydrogen) catalyst.

TMC (10.00 g, 0.098 mol) and Dowex® 50x8-200 ion-exchange resin (Dowex® 50W-Hydrogen) (2.5 g) were placed in three round bottomed flasks equipped with stirrer and under nitrogen. To the first flask 25 mL of methylene chloride was added, to the second flask 50 mL of methylene chloride was added and to the third flask 100 mL of methylene chloride. The reaction mixture was stirred at room temperature. Aliquots were withdrawn after 17 hours, concentrated at reduced pressure and analyzed via Proton NMR. The following table tabulates the results:

| Example | Methylene Chloride (mL) | N (17 Hr) |
|---|---|---|
| 6 | 25 | 2.64 |
| 7 | 50 | 2.47 |
| 8 | 100 | 2.10 |

Examples 9-11

These Examples demonstrate the effect of catalyst amount on the production of poly(trimethylene carbonate) glycol using Nafion® NR50 copolymer as catalyst.

TMC (10.00 g, 0.098 mol) and methylene chloride (25 mL) were placed in three round bottomed flasks equipped with stirrer and under nitrogen. To the first flask 0.5 g of Nafion® was added, to the second flask 1.0 g of Nafion® was added and to the third flask 2.00 g of Nafion® was added. The reaction mixture was stirred at room temperature. Aliquots were withdrawn after ~6 hours and ~22 hours, concentrated at reduced pressure and analyzed via Proton NMR. The following table tabulates the results:

| Example | Nafion ® NR50 (g) | Conversion (6 Hr) (%) | Conversion (22 Hr) (%) | N (25 Hr) |
|---|---|---|---|---|
| 9 | 0.50 | 5.88 | 59.38 | 12.02 |
| 10 | 1.00 | 11.81 | 73.41 | 14.48 |
| 11 | 2.00 | 25.07 | 100 | 12.80 |

Examples 12-14

These Examples demonstrate the effect of catalyst amount on the production of poly(trimethylene carbonate) glycol using Dowex® 50x8-200 ion-exchange resin (Dowex® 50W-Hydrogen) as catalyst.

TMC (10.00 g, 0.098 mol) and methylene chloride (25 mL) were placed in three round bottomed flasks equipped with stirrer and under nitrogen. To the first flask 0.5 g of Dowex® 50x8-200 ion-exchange resin (Dowex® 50W-Hydrogen) was added, to the second flask 1.0 g of Dowex® 50x8-200 ion-exchange resin (Dowex® 50W-Hydrogen) was added and to the third flask 2.00 g of Dowex 50x8-200 ion-exchange resin (Dowex 50W-Hydrogen) was added. The reaction mixture was stirred at room temperature. Aliquots were withdrawn after ~5 hours and ~22 hours, concentrated at reduced pressure and analyzed via Proton NMR. The following table tabulates the results:

| Example | Dowex ® 50x8-200 ion-exchange resin (Dowex ® 50W-Hydrogen) (g) | Conversion (5 Hr) (%) | Conversion (22 Hr) (%) | N (25 Hr) |
|---|---|---|---|---|
| 12 | 0.50 | 13.2 | 47.93 | 5.24 |
| 13 | 1.00 | 20.06 | 92.19 | 4.84 |
| 14 | 2.00 | 47.92 | 98.20 | 2.97 |

Examples 15-17

These Examples demonstrate the effect of catalyst amount on the production of poly(trimethylene carbonate) glycol using Nafion® NR50 copolymer as catalyst. Toluene was used as the solvent.

TMC (10.00 g, 0.098 mol) and toluene (25 mL) were placed in three round bottomed flasks equipped with stirrer and under nitrogen. To the first flask 0.5 g of Nafion® copolymer was added, to the second flask 1.0 g of Nafion® copolymer was added and to the third flask 2.00 g of Nafion® copolymer was added. The reaction mixture was stirred at room temperature. Aliquots were withdrawn after ~4 hours and ~20 hours, concentrated at reduced pressure and analyzed via Proton NMR. The following table tabulates the results:

| Example | Nafion ® NR50 (g) | Conversion (4 Hr) (%) | Conversion (20 Hr) (%) | N (20 Hr) |
|---|---|---|---|---|
| 15 | 0.50 | ~0 | 24.3 | 9.88 |
| 16 | 1.00 | 7.86 | 39.42 | 12.66 |
| 17 | 2.00 | 17.03 | 75.51 | 12.82 |

Examples 18-20

These Examples demonstrate the effect of catalyst amount on the production of poly(trimethylene carbonate) glycol using Nafion® NR50 copolymer as catalyst. Dioxane was used as the solvent.

TMC (10.00 g, 0.098 mol) and dioxane (25 mL) were placed in three round bottomed flasks equipped with stirrer and under nitrogen. To the first flask 0.5 g of Nafion® was added, to the second flask 1.0 g of Nafion® was added and to the third flask 2.00 g of Nafion® was added. The reaction mixture was stirred at room temperature. Aliquots were withdrawn after ~4 hours and ~20 hours, concentrated at reduced pressure and analyzed via Proton NMR. The following table tabulates the results:

| Experiment | Nafion ® NR50 (g) | Conversion (6 Hr) (%) | Conversion (22 Hr) (%) | N (22 Hr) |
|---|---|---|---|---|
| 18 | 0.50 | ~0 | 21.89 | — |
| 19 | 1.00 | ~0 | 47.32 | — |
| 20 | 2.00 | 17.35 | 88.24 | 9.57 |

Examples 20 and 21 (A-J)

The following examples demonstrate the recycling of Nafion® NR50 copolymer used as catalyst in producing poly(trimethylene carbonate) glycol.

Example 20

A stock solution containing trimethylene chloride (136.0 g) and diluted to 400 mL with methylene chloride was prepared, this representing a 3.33M solution.

Example 21A

Nafion® Copolymer Catalyst Cycle: Number 1

The above stock solution (Example 20, 30 mL) was added, via syringe, to an oven dried 100 mL round bottomed flask equipped with a stirrer and under nitrogen, containing Nafion® NR50 (2.0 g). The reaction mixture was stirred at room temperature. An aliquots were withdrawn after 3.5 and 22 hrs, concentrated at reduced pressure and analyzed via NMR. After 22 hours the reaction mixture was filtered and the recovered Nafion® catalyst was washed with methylene chloride (2×~50 mL). The filtrate was concentrated at reduced pressure and dried under nitrogen.

Example 21B

Nafion® Copolymer Catalyst Cycle: Number 2

The recovered catalyst was placed in an oven dried 100 mL RB flask equipped with a stirrer and under nitrogen. To this material was added the above stock solution (30 mL), via syringe. The reaction mixture was stirred at room temperature. An aliquots were withdrawn after 6 and 22 hrs., concentrated at reduced pressure and analyzed via NMR. After 22 hours the reaction mixture was filtered and the recovered Nafion® catalyst was washed with methylene chloride (2×~50 mL). This recovered catalyst was used in the next cycle. The filtrate was concentrated at reduced pressure and dried under nitrogen.

Example 21C-J

Nafion® Copolymer Catalyst Cycles 3-10

The above procedure of Number 2 was followed for the continuing number of cycles and the materials analyzed via Proton NMRs, the results of which are tabulated in the following table:

| Example | Cycle Number | Time (Hr) | Conversion (%) | Time (Hr) | Conversion (%) | n (Final) |
|---|---|---|---|---|---|---|
| 21A | 1 | 3.3 | 14.31 | 22 | 98.21 | 13.42 |
| 21B | 2 | 6.0 | 47.20 | 22 | 97.75 | 22.54 |
| 21C | 3 | 6.0 | 67.09 | 22 | 99.06 | 21.77 |
| 21D | 4 | 6.0 | 67.09 | 71 | ~100 | 22.85 |
| 21E | 5 | 6.0 | 79.20 | 24 | ~100 | 15.80 |
| 21F | 6 | — | — | 23 | ~100 | 19.53 |
| 21G | 7 | 6.0 | 79.37 | 23 | ~100 | 17.41 |
| 21H | 8 | 6.0 | 72.04 | 23 | ~100 | 19.96 |
| 21I | 9 | 6.0 | 75.47 | 73 | ~100 | 18.88 |
| 21J | 10 | 6.0 | 77.53 | 22 | ~100 | 13.65 |

Examples 22A-E

The following examples demonstrate the recycling of Dowex® 50x8-200 ion-exchange resin catalyst in producing poly(trimethylene carbonate) glycol.

Example 22A

Dowex® 50x8-200 Ion-Exchange Resin Catalyst Cycle: Number 1

TMC (10.00 g, 0.098 mol), methylene chloride (25 g) and Dowex® 50x8-200 ion-exchange resin (2.5 g) were place in a round bottomed flask equipped with a stirrer and under nitrogen. The reaction mixture was stirred at room temperature. After 17 hrs an aliquot was withdrawn and concentrated at reduced pressure. Proton NMR analysis showed a ~97.54%, with n=~2.64. The reaction mixture was filtered, the filtrate washed with additional methylene chloride.

Example 22B

Dowex® 50x8-200 Ion-Exchange Resin Catalyst Cycle: Number 2

The recovered catalyst from Example 22A above was placed in an oven dried 100 mL round bottomed flask equipped with a stirrer and under nitrogen. To this material was added trimethylene carbonate (10.00 g, 0.098 mol), and methylene chloride (25 g). The reaction was allowed to stir at room temperature over the week-end. An aliquot was withdrawn after ~70 hours, concentrated at reduced pressure. Proton NMR analysis showed a ~98.43%, with n=~7.6.

Examples 22C-E

Dowex® 50x8-200 Ion-Exchange Resin Catalyst Cycle: Numbers 3-5

The above procedure of Number 2 (Example 22B) was followed for the continuing number of cycles and the materials analyzed via Proton NMRs, the results of which are tabulated in the following table:

| Example | Cycle | Time (Hr) | Conversion (%) | Time (Hr) | Conversion (%) | n (Final) |
|---|---|---|---|---|---|---|
| 22A | 1 | | | 17 | 87.54 | 2.64 |
| 22B | 2 | | | ~70 | 98.43 | 7.60 |
| 22C | 3 | 6.0 | 30.72 | 22 | 74.62 | 2.88 |

-continued

| Example | Cycle | Time (Hr) | Conversion (%) | Time (Hr) | Conversion (%) | n (Final) |
|---|---|---|---|---|---|---|
| 22D | 4 | 6.0 | 11.27 | 22 | 46.54 | 1.22 |
| 22E | 5 | 6.0 | 8.72 | 22 | 38.25 | 2.12 |

What is claimed is:

1. A process for producing an unsubstituted or R-substituted poly(trimethylene carbonate) glycol comprising,
preparing a reaction mixture consisting essentially of an unsubstituted or R-substituted trimethylene carbonate, an acidic ion exchange resin as a catalyst, and one or more solvents at a temperature within the range of from the freezing point of the solvent(s) to about 30 degrees Celsius,
wherein the one or more solvents are substantially nonreactive with the unsubstituted or R-substituted trimethylene carbonate, and
wherein poly(trimethylene carbonate) glycol is produced in the reaction mixture.

2. The process of claim 1, wherein the ion exchange resin is selected from the group consisting of ion-exchange resins comprising poly(styrenesulfonic acid) crosslinked with divinylbenzene.

3. The process of claim 1, wherein the acidic ion exchange resin is a (tetrafluoroethylene/perfluoro(4-methyl-3,6-dioxa-7-octene-1-sulfonic acid) copolymer.

4. The process of claim 3, wherein the substantially non-reactive one or more solvents is selected from the group consisting of methylene chloride, toluene and dioxane.

5. The process of claim 1, further comprising isolating the poly(trimethylene carbonate) glycol.

6. The process of claim 1, wherein the unsubstituted or R-substituted poly(trimethylene carbonate) glycol has the structural formula,

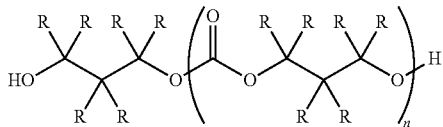

wherein,
each R substituent is independently H, $C_1$-$C_{20}$ alkyl; $C_3$-$C_{20}$ cyclic alkyl; $C_6$-$C_{25}$ aryl; $C_6$-$C_{20}$ alkaryl; $C_6$-$C_{20}$ arylalkyl; and wherein each R substituent may form a cyclic structural group with adjacent R substituents; and n is 2 to 100.

* * * * *